US012799322B2

(12) United States Patent
Lee

(10) Patent No.: US 12,799,322 B2
(45) Date of Patent: Nov. 17, 2026

(54) TALC-FILLED POLYCARBONATE COMPOSITION AND METHOD FOR MAKING SAME

(71) Applicant: Dow Global Technologies LLC, Midland, MI (US)

(72) Inventor: Jong-young Lee, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 635 days.

(21) Appl. No.: 18/258,275

(22) PCT Filed: Dec. 13, 2021

(86) PCT No.: PCT/US2021/063146
§ 371 (c)(1),
(2) Date: Jun. 19, 2023

(87) PCT Pub. No.: WO2022/132663
PCT Pub. Date: Jun. 23, 2022

(65) Prior Publication Data

US 2024/0034877 A1 Feb. 1, 2024

Related U.S. Application Data

(60) Provisional application No. 63/126,724, filed on Dec. 17, 2020.

(51) Int. Cl.
*C08L 69/00* (2006.01)
*C08J 3/20* (2006.01)

(52) U.S. Cl.
CPC ............... *C08L 69/00* (2013.01); *C08J 3/203* (2013.01); *C08J 2335/02* (2013.01); *C08J 2423/08* (2013.01)

(58) Field of Classification Search
CPC ....... C08L 69/00; C08J 3/203; C08J 2335/02; C08J 2423/08
See application file for complete search history.

(56) References Cited

U.S. PATENT DOCUMENTS

| | | | | |
|---|---|---|---|---|
| 5,179,161 | A * | 1/1993 | Saito | C08L 71/123 525/394 |
| 7,879,949 | B2 | 2/2011 | Chou | |
| 8,536,292 | B2 | 9/2013 | Mongoin et al. | |
| 9,777,145 | B2 | 10/2017 | Chou | |
| 10,189,941 | B2 | 1/2019 | Wehrmann et al. | |
| 10,316,185 | B2 | 6/2019 | Choi et al. | |
| 11,535,747 | B2 | 12/2022 | Hungerland et al. | |
| 2008/0255303 | A1 | 10/2008 | Chou | |
| 2009/0227739 | A1 | 9/2009 | Chou | |
| 2016/0280910 | A1 | 9/2016 | Erkelenz et al. | |

FOREIGN PATENT DOCUMENTS

| | | | | |
|---|---|---|---|---|
| JP | 3051278 | B2 | 6/2000 | |
| JP | 2020158663 | A | 10/2020 | |
| WO | WO-2006001570 | A1 * | 1/2006 | A22C 25/17 |

* cited by examiner

*Primary Examiner* — Patrick D Niland

(57) ABSTRACT

Provided are talc-filled polycarbonate compositions, and methods for making the same. The talc-filled polycarbonate compositions include a polycarbonate, a talc, and a modifier composition. The modifier composition according to embodiments disclosed herein comprises (i) from 5 to 95 wt. % of an ethylene interpolymer comprising copolymerized units of ethylene and a comonomer selected from the group consisting of maleic anhydride, maleic acid monoester, maleic acid diester, fumaric acid monoester, carboxylic acid, itaconic acid, fumaric acid, itaconic acid monoester, and combinations thereof, and (ii) from 5 to 95 wt. % of an ethylene/methyl acrylate copolymer having a melt index (½) of greater than 15 g/10 min. The talc-filled polycarbonate compositions according to embodiments disclosed herein exhibit an improved dart impact.

17 Claims, No Drawings

TALC-FILLED POLYCARBONATE COMPOSITION AND METHOD FOR MAKING SAME

TECHNICAL FIELD

Embodiments of the present disclosure generally relate to a talc-filled polycarbonate composition and method for making same, and more particularly relate to a talc-filled polycarbonate composition comprising a modifier composition.

INTRODUCTION

Polycarbonate compositions are plastics that can have excellent characteristics in terms of impact resistance, heat resistance, and dimensional stability. For example, a blend of polycarbonate and inorganic filler can be used to produce molded articles requiring high rigidity. Polycarbonate is known for its high thermal resistance and toughness, and when a filler such as talc is incorporated into polycarbonate, the talc can increase the stiffness and decrease the thermal expansion coefficient of the resulting polycarbonate composition. The talc, however, has hydroxide groups that can degrade polycarbonate and consequently deteriorate the toughness of the polycarbonate composition. Accordingly, there remains a need for a talc-filled polycarbonate composition that can exhibit good toughness and dart impact properties.

SUMMARY

Embodiments of the present disclosure meet the foregoing needs by providing a talc-filled polycarbonate composition including a specific modifier composition. The modifier composition comprises an ethylene interpolymer and an ethylene/methyl acrylate copolymer. Without being bound by theory, it is believed the ethylene interpolymer, as described herein, can react with the hydroxide groups of talc to inhibit the degradation of polycarbonate and the ethylene/methyl acrylate copolymer, as described herein, can provide positive synergy with the ethylene interpolymer to increase dart impact.

Disclosed herein is a talc-filled polycarbonate composition. The talc-filled polycarbonate composition comprises (a) at least 65 wt. % of a polycarbonate; (b) from 10 to 30 wt. % of a talc; and (c) from 0.5 to 5.0 wt. % of a modifier composition, the modifier composition comprising (i) from 5 to 95 wt. %, based on total weight of components in the modifier composition, of an ethylene interpolymer comprising copolymerized units of ethylene and a comonomer selected from the group consisting of maleic anhydride, maleic acid monoester, maleic acid diester, fumaric acid monoester, carboxylic acid, itaconic acid, fumaric acid, itaconic acid monoester, and combinations thereof, and (ii) from 5 to 95 wt. %, based on total weight of components in the modifier composition, of an ethylene/methyl acrylate copolymer having a melt index ($I_2$) of greater than 15 g/10 min (alternatively, greater than 25 g/10 min or greater than 35 g/10 min).

Also disclosed herein is a method of manufacturing a talc-filled polycarbonate composition. The method of manufacturing the talc-filled polycarbonate composition comprises blending the following together: (a) at least 65 wt. % of a polycarbonate; (b) from 10 to 30 wt. % of a talc; and (c) from 0.5 to 5.0 wt. % of a modifier composition, the modifier composition comprising (i) from 5 to 95 wt. %, based on total weight of components in the modifier composition, of an ethylene interpolymer comprising copolymerized units of ethylene and a comonomer selected from the group consisting of maleic anhydride, maleic acid monoester, maleic acid diester, fumaric acid monoester, carboxylic acid, itaconic acid, fumaric acid, itaconic acid monoester, and combinations thereof, and (ii) from 5 to 95 wt. %, based on total weight of components in the modifier composition, of an ethylene/methyl acrylate copolymer having a melt index ($I_2$) of greater than 15 g/10 min (alternatively, greater than 25 g/10 min or greater than 35 g/10 min).

These and other embodiments are described in more detail in the Detailed Description.

DETAILED DESCRIPTION

Aspects of the disclosed polycarbonate compositions are described in more detail below. The polycarbonate compositions can be used to produce a wide variety of articles, including, for example, household appliances, electronic products, and automobile exterior or interior materials. It is noted, however, that this is merely an illustrative implementation of the embodiments disclosed herein. The embodiments are applicable to other technologies that are susceptible to similar problems as those discussed above.

The term "polymer" means a polymeric compound prepared by polymerizing monomers, whether of the same or a different type. The generic term polymer thus embraces the term homopolymer (employed to refer to polymers prepared from only one type of monomer), and the term copolymer or interpolymer. Trace amounts of impurities (for example, catalyst residues) may be incorporated into and/or within the polymer. A polymer may be a single polymer, a polymer blend, or a polymer mixture, including mixtures of polymers that are formed in situ during polymerization.

The term "interpolymer" refers to a polymer prepared by the polymerization of at least two different types of monomers. The term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/methyl acrylate copolymer" refers to a polymer comprising copolymerized units of ethylene monomer and methyl acrylate comonomer.

The term "(meth)acrylic acid" refers to methacrylic acid or acrylic acid.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

A talc-filled polycarbonate composition is disclosed herein. The composition comprises a polycarbonate, a talc, and a modifier composition.

The polycarbonate of the talc-filled polycarbonate composition is not particularly limited. In embodiments, the polycarbonate composition is a thermoplastic polycarbonate resin. The polycarbonate can be an aromatic polycarbonate prepared by reacting a carbonate precursor such as phosgene, halogen formate, and carbonic diester with diphenols. Examples of the diphenols include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, and 2,2-bis(3,5-dichloro-4-hydroxyphenyl)propane, without being limited thereto. For example, the diphenols may be 2,2-bis(4-hydroxyphenyl)propane, 2,2-bis(3,5-dichloro-4-hydroxyphenyl)propane, or 1,1-bis(4-hydroxyphenyl)cyclohexane, specifically 2,2-bis-(4-hydroxyphenyl)-propane, which is also referred to as bisphenol A. In embodiments, the polycarbonate can be a branched polycarbonate and can be a homopolycarbonate, copolycarbonate, or a blend thereof.

In embodiments, the talc-filled polycarbonate composition comprises at least 65 wt. % of a polycarbonate. That is, the polycarbonate is present, based on the total weight of the talc-filled polycarbonate composition, in an amount of at least 65 wt. %. All individual values and subranges of at least 65 wt. % are disclosed and included herein. For example, the talc-filled polycarbonate composition can comprise at least 65 wt. %, at least 70 wt. %, at least 75 wt. %, at least 80 wt. %, or at least 85 wt. % of a polycarbonate, or from 65 to 85 wt. %, from 70 to 85 wt. %, from 75 to 85 wt. %, from 80 to 85 wt. %, from 75 to 80 wt. %, or from 80 to 85 wt. % of a polycarbonate, where weight percent (wt. %) is based on total weight of the talc-filled polycarbonate composition.

Examples of a polycarbonate suitable for use in embodiments of the present invention include Makrolon 2607, a polycarbonate commercially available from Covestro AG (Leverkusen, Germany).

The talc-filled polycarbonate composition disclosed herein comprises a talc. The talc of the talc-filled polycarbonate composition is not particularly limited. In embodiments, the talc can be a synthetically manufactured talc and/or a surface treated talc.

In embodiments, the talc-filed polycarbonate composition comprises from 10 to 30 wt. % of a talc. That is, the talc is present, based on total weight of the talc-filled polycarbonate composition, in an amount of from 10 to 30 wt. %. All individual values of from 10 to 30 wt. % are disclosed and included herein. For example, the talc-filled polycarbonate composition can comprise from 10 to 30 wt. %, from 15 to 30 wt. %, from 20 to 30 wt. %, from 25 to 30 wt. %, from 10 to 25 wt. %, from 10 to 20 wt. %, from 10 to 15 wt. %, from 15 to 25 wt. %, from 15 to 25 wt. %, from 15 to 20 wt. %, or from 20 to 25 wt. %, where weight percent (wt. %) is based on total weight of the talc-filled polycarbonate composition.

Examples of a talc suitable for use in embodiments of the present invention include CIMPACT 710C, a talc commercially available from Imerys (Paris, France).

The talc-filled polycarbonate composition disclosed herein comprises a modifier composition. The modifier composition comprises (i) from 5 to 95 wt. %, based on total weight of components in the modifier composition, of an ethylene interpolymer comprising copolymerized units of ethylene and a commoner selected from the group consisting of maleic anhydride, maleic acid monoester, maleic acid diester, fumaric acid monoester, carboxylic acid, itaconic acid, fumaric acid, itaconic acid monoester, and combinations thereof, and (ii) from 5 to 95 wt. %, based on total weight of components of the modifier composition, of an ethylene/methyl acrylate copolymer having a melt index (I2) greater than 15 g/10 min (alternatively, greater than 25 g/10 min or greater than 35 g/10 min).

In embodiments, the ethylene interpolymer of the modifier composition comprises copolymerized units of greater than 50 wt. % units derived ethylene and less than 50 wt. % units derived from a comonomer selected from the group consisting of maleic anhydride, maleic acid monoester, maleic acid diester, fumaric acid monoester, carboxylic acid, itaconic acid, fumaric acid, itaconic acid monoester, and combinations thereof (based on the total amount of polymerizable monomers). All individual values and subranges of greater than 50 wt. % of the units derived from ethylene and less than 50 wt. % of the units derived from a comonomer selected from the group consisting of maleic anhydride, maleic acid monoester, maleic acid diester, fumaric acid monoester, carboxylic acid, itaconic acid, fumaric acid, itaconic acid monoester, and combinations thereof are included and disclosed herein. For example, in some embodiments, the ethylene interpolymer comprises (a) greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 92%, greater than or equal to 95%, greater than or equal to 97%, greater than or equal to 98%, greater than or equal to 99%, greater than or equal to 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5% from 90% to 99%, from 90% to 97%, from 90% to 95%, from 93% to 99.9%, from 93% to 99.5% from 93% to 99%, or from 93% to 97%, by weight, of the units derived from ethylene; and (b) less than 50%, for example, less than 40%, or less than 30%, less than 18%, less than 15%, less than 12%, less than 10%, less than 8%, less than 5%, from 0.1 to 40%, from 5 to 20%, from 5 to 15%, 5 to 12%, 5 to 10%, 5 to 8%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from a comonomer selected from the group consisting of maleic anhydride, maleic acid monoester, maleic acid diester, fumaric acid monoester, carboxylic acid, itaconic acid, fumaric acid, itaconic acid monoester, and combinations thereof (based on the total amount of polymerizable monomers). For example, in embodiments, the comonomer of the ethylene interpolymer is present in an amount of from to 15 w.%, based on total weight of the ethylene interpolymer. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

In embodiments, the ethylene interpolymer is an ethylene/maleate interpolymer. An ethylene/maleate interpolymer refers herein to interpolymers of ethylene and at least one functional commoner selected from the group consisting of maleic acid monoester, maleic acid diester, fumaric acid monoester, carboxylic acid, itaconic acid, fumaric acid, itaconic acid monoester, and combinations thereof. Ethylene/maleate interpolymers also include E/X/Y terpolymers, wherein: E is ethylene, X is a commoner selected from the group consisting of maleic anhydride, maleic acid monoester, maleic acid diester, fumaric acid monoester, carboxylic acid, itaconic acid, fumaric acid, itaconic acid monoester, and combinations thereof; and Y is a comonomer selected from the group consisting of alkyl acrylate, vinyl acetate, and (meth)acrylic acid.

The ethylene interpolymer of the modifier composition can be obtained by a high-pressure free radical polymerization process. A high-pressure process suitable for use in the practice of the present invention is described, for example, in U.S. Pat. No. 4,351,931, the teachings therein incorporated herein by reference.

In embodiments, the comonomer of the ethylene interpolymer is maleic acid monoester.

In embodiments, the modifier composition comprises from 5 to 95 wt. %, based on total weight of components in the modifier composition, of an ethylene interpolymer comprising copolymerized units of ethylene and a commoner selected from the group consisting of maleic anhydride, maleic acid monoester, maleic acid diester, fumaric acid monoester, carboxylic acid, itaconic acid, fumaric acid, itaconic acid monoester, and combinations thereof. All individual values of from 5 to 95 wt. % are disclosed an included herein. For example, the modifier composition can comprise, based on total weight of component in the modifier composition, from 5 to 95 wt. %, from 10 to 95 wt. %, from 15 to 95 wt. %, from 20 to 95 wt. %, from 5 to 85 wt. %, from 10 to 85 wt. %, from 15 to 85 wt. %, from to 85 wt. %, from 5 to 75 wt. %, from 10 to 75 wt. %, from 15 to 75 wt. %, from 20 to 75 wt. %, from 5 to 70 wt. %, from 10 to 70 wt. %, from 15 to 70 wt. %, or from 20 to 70 wt. % of an ethylene interpolymer comprising copolymerized units of ethylene and a commoner selected from the group consisting of maleic anhydride, maleic acid monoester, maleic acid diester, fumaric acid monoester, carboxylic acid, itaconic acid, fumaric acid, itaconic acid monoester, and combinations thereof.

In embodiments, the modifier composition comprises from 5 to 95 wt. %, based on total weight of components of the modifier composition, of an ethylene/methyl acrylate copolymer having a melt index (I 2) greater than 15 g/10 min (alternatively, greater than 25 g/10 min or greater than 35 g/10 min). All individual values of from 5 to 95 wt. % are disclosed and included herein. For example, the modifier composition can comprise, based on total weight of components in the modifier composition, from 5 to 95 wt. %, from 10 to 95 wt. %, from 15 to wt. %, from 20 to 95 wt. %, from 5 to 85 wt. %, from 10 to 85 wt. %, from 15 to 85 wt. %, from 20 to 85 wt. %, from 5 to 75 wt. %, from 10 to 75 wt. %, from 15 to 75 wt. %, from 20 to wt. %, from 5 to 70 wt. %, from 10 to 70 wt. %, from 15 to 70 wt. %, or from 20 to 70 wt. % of an ethylene/methyl acrylate copolymer having a melt index ($I_2$) greater than 15 g/10 min.

In embodiments, the ethylene/methyl acrylate copolymer of the modifier composition has a melt index (I 2) greater than 15 g/10 min. All individual values and subranges of greater than 15 g/10 min are disclosed and included herein. For example, the ethylene/methyl acrylate copolymer of the modifier composition can have a melt index ($I_2$) greater than 15 g/10 min, greater than 20 g/10 min, greater than 25 g/10 min, greater than 30 g/10 min, greater than g/10 min, greater than 40 g/10 min, or greater than 45 g/10 min, or a melt index (I 2) in the range of from 15 to 500 g/10 min, from 15 to 400 g/10 min, from 15 to 300 g/10 min, from 15 to 200 g/10 min, from 15 to 100 g/10 min, from 25 to 500 g/10 min, from 25 to 400 g/10 min, from 25 to 300 g/10 min, from 25 to 200 g/10 min, from 25 to 100 g/10 min, from 35 to 500 g/10 min, from 35 to 400 g/10 min, from 35 to 300 g/10 min, from 35 to 200 g/10 min, or from to 100 g/10 min.

In embodiments, the ethylene/methyl acrylate copolymer has a methyl acrylate content of from 15 to 40 wt. %, based on total weight of the ethylene/methyl acrylate. All individual values and subranges of from 15 to 40 wt. % are disclosed and included herein. For example, the ethylene/methyl acrylate can have a methyl acrylate content of from 15 to 40 wt. %, from 15 to 30 wt. %, from 15 to 25 wt. %, from 20 to 40 wt. %, from 20 to 30 wt. %, or from 20 to 25 wt. %, based on total weight of the ethylene/methyl acrylate.

Examples of an ethylene/methyl acrylate copolymer suitable for use in embodiments of the present invention include ELVALOY™ AC 15024S, commercially available form the Dow Chemical Company (Midland, MI).

In embodiments, the talc-filled polycarbonate composition may contain one or more additives as generally known in the art. Such additives include antioxidants, such as IRGANOX 1010 and IRGAFOS 168 (commercially available from BASF), ultraviolet light absorbers, antistatic agents, pigments, dyes, nucleating agents, fillers, slip agents, fire retardants, plasticizers, processing aids, lubricants, stabilizers, smoke inhibitors, viscosity control agents, surface modification agents, and anti-blocking agents. In embodiments, the one or more additives are included in amounts ranging from 0 to 10 wt. % of the talc-filled polycarbonate composition, 0 to 5 wt. % of the talc-filled polycarbonate composition, 0 to 3 wt. % of the talc-filled polycarbonate composition, 0.001 to 10 wt. % of the talc-filled polycarbonate composition, 0.001 to 5 wt. % of the talc-filled polycarbonate composition, 0.001 to 3 wt. %, of the talc-filled polycarbonate composition, 0.05 to 10 wt. % of the talc-filled polycarbonate composition, 0.05 to 5 wt. % of the talc-filled polycarbonate composition, or 0.05 to 3 wt. % of the talc-filled polycarbonate composition.

The talc-filled polycarbonate composition of the present invention can be used to form articles such as household appliances and electronic products. Such articles can be formed from any of the talc-filled polycarbonate compositions described herein.

The talc-filled polycarbonate composition of the present invention can have several desirable properties. For example, the talc-filled polycarbonate composition can have a dart impact greater than 11.0 Joules (J), where dart impact is measured in accordance with the test method described below. All individual values and subranges of greater than 11.0 J are included and disclosed herein. For example, the talc-filled polycarbonate composition can have a dart impact greater than 11.0 J, greater than 12.0 J, greater than 13.0 J, greater than 14.0 J, greater than 15.0 J, greater than 16.0 J, greater than 17.0 J, greater than 18.0 J, or greater than 19.0 J, where dart impact is measured in accordance with the test method described below.

The dart impact of the talc-filled polycarbonate composition can also be described in relation to the concentration of the components in the modifier composition. For example, without being bound by any theory, when the amount of the ethylene interpolymer of the modifier composition increases and correspondingly the amount of the ethylene/methyl acrylate decreases, the dart impact of the talc-filled polycarbonate can increase. In embodiments, where the concentration of the ethylene interpolymer as described above is greater than 15 wt. %, based on total weight of the components in the modifier composition, the talc-filled polycarbonate composition can have a dart impact greater than 11.0 J, where dart impact is measured in accordance with the test method described above. In further embodiments, where the concentration of the ethylene interpolymer as described above is greater than 25 wt. %, based on total weight of the components in the modifier composition, the talc-filled polycarbonate composition can have a dart impact greater than 13.0 J, where dart impact is measured in accordance with the test method described above. In even further embodiments, where the concentration of the ethylene interpolymer as described above is greater than 45 wt. %, based on total weight of the components in the modifier composition, the talc-filled polycarbonate composition can have a dart impact greater than 15.0 J, where dart impact is measured in accordance with the test method described above. And in even further embodiments, where the concentration of the ethylene interpolymer as described above is greater than 55 wt. %, based on total weight of the components in the modifier composition, the talc-filled polycarbonate composition can have a dart impact greater than 17.0 J, where dart impact is measured in accordance with the test method described above.

A method of manufacturing the talc-filled polycarbonate composition described herein is also disclosed. The method of manufacturing the talc-filled polycarbonate composition comprises blending the following together: (a) at least 65 wt. % of a polycarbonate; (b) from 10 to 30 wt. % of a talc; and (c) from 0.5 to 5.0 wt. % of a modifier composition, the modifier composition comprising (i) from 5 to 95 wt. %, based on total weight of components in the modifier composition, of an ethylene interpolymer comprising copolymerized units of ethylene and a comonomer selected from the group consisting of maleic anhydride, maleic acid monoester, maleic acid diester, fumaric acid monoester, carboxylic acid, itaconic acid, fumaric acid, itaconic acid monoester, and combinations thereof, and (ii) from 5 to 95 wt. %, based on total weight of components in the modifier composition, of an ethylene/methyl acrylate copolymer having a melt index ($I_2$) of greater than 15 g/10 min (alternatively, greater than 25 g/10 min or greater than 35 g/10 min).

In embodiments, the method of manufacturing the talc-filled polycarbonate composition comprises melt blending the foregoing described components (a), (b), and (c) together. In further embodiments, the method of manufacturing the talc-filled polycarbonate composition further comprises extruding the components of the composition.

In embodiments, the method of manufacturing the talc-filled polycarbonate composition comprises (1) providing a modifier composition comprising (a) 5 to 95 wt. % of an ethylene interpolymer comprising copolymerized units of ethylene and a comonomer selected from the group consisting of maleic anhydride, maleic acid monoester, maleic acid diester, fumaric acid monoester, carboxylic acid, itaconic acid, fumaric acid, itaconic acid monoester, and combinations thereof, and (b) from 5 to 95 wt. % of an ethylene/methyl acrylate copolymer having a melt index (I 2) of greater than 15 g/10 min (alternatively, greater than 25 g/10 min or greater than 35 g/10 min); and (2) blending from 0.5 to 5.0 wt. % of the modifier composition with from 10 to 30 wt. % of a talc and at least 65 wt. % of a polycarbonate to form the talc-filled polycarbonate composition.

Test Methods

Melt Index ($I_2$)

Melt index ($I_2$) is measured in accordance with ASTM D-1238 at 190° C. at 2.16 kg. The values are reported in g/10 min, which corresponds to grams eluted per 10 minutes.

Dart Impact

Samples are prepared in accordance with the description in the Examples section below. The Inventive and Comparative Examples are dried at 110° C. for four hours before being injection molded on a Krauss Maffei injection molding machine to make a disc of 4 inches in diameter and 3.1 mm in thickness for an instrumented dart impact test. The temperature in different zones and nozzle during injection molding is between 270-300° C., the injection pressure is 2000 bar and the hold pressure is 200 bar. The cooling time is 40 seconds.

An instrumented dart impact test is performed on each disc formed from the Inventive and Comparative Examples. The test method is in accordance with ASTM D3763, which provides the load versus deformation response of plastic plaques under multiaxial deformation conditions at impact velocities. The samples are conditioned at 23° C.+/−2° C. and 50%+/−10% Relative Humidity (RH) for at least 40 hours prior to testing (per ASTM D618) and are tested under the same conditions. The samples are pneumatically clamped such that the unsupported test region has a diameter of 76+/−3 mm. The sample size is such that at least 13 mm of material is clamped. The sample is impacted by a stainless steel plunger 12.7+/−0.13 mm in diameter with a hemispherical end of the same diameter. The plunger is a free-falling, gravity driven device, with the impact speed determined by the drop height (with allowances made for friction). The impact speed applied on the specimen is 6.66 m/s. The plunger assembly is of sufficient mass that the reduction in velocity at the end of the test is less than 20%. From the load—displacement curve, the total impact energy (under the curve area) is reported. Measurements of dart impact are reported in Joule (J).

EXAMPLES

The following examples illustrate features of the present disclosure but are not intended to limit the scope of the disclosure.

Materials

The following materials are included in the examples.

- Makrolon 2607, a polycarbonate commercially available from Covestro AG (Leverkusen, Germany)
- CIMPACT 710C, a talc commercially available from Imerys (Paris, France).
- Irganox 1010 and Irgafos 168 ("Antioxidant"), antioxidants commercially available from BASF.
- ELVALOY™ AC 15024S, an ethylene/methyl acrylate copolymer having a methyl acrylate content of 24 wt. % and a melt index ($I_2$) of 50 g/10 min.
- ELVALOY™ AC 1224, an ethylene/methyl acrylate copolymer having a methyl acrylate content of 24 wt. % and a melt index ($I_2$) of 2.0 g/10 min.
- ELVALOY™ AC 34035, an ethylene/butyl acrylate copolymer having a butyl acrylate content of 35 wt. % and a melt index ($I_2$) of 40 g/10 min.
- ELVALOY™ AC 3427, an ethylene/butyl acrylate copolymer having a butyl acrylate content of 27 wt. % and a melt index ($I_2$) of 4.0 g/10 min.

The materials under the trade name ELVALOY™ AC are commercially available from the Dow Chemical Company (Midland, MI).

Polymer 1, a maleic anhydride grafted ethylene acrylate copolymer having a maleic anhydride content of 1.8 wt. % and melt index ($I_2$) of 1.8 g/10 min.

Polymer 2, an ethylene interpolymer comprising copolymerized units of ethylene and a comonomer of maleic acid monoester having a maleic acid monoester content of 10 wt.

% and a melt index ($I_2$) of 25 g/10 min Polymer 2 can be formed via the process and polymerization conditions provided below.

Production of Polymer 2

Polymer 2 is made in a continuous, stirred-tank reactor in which ethylene and a comonomer (i.e., maleic acid monoester) is introduced to the copolymerization reactor with at least one free-radical copolymerization initiator, according to known copolymerization techniques. Typical copolymerization initiators used include peroxygen compounds such as t-butyl peracetate, t-butyl peroxypivalate, t-butyl peroctoate, di-t-butyl peroxide, or di-sec-butyl peroxydicarbonate. Other free radical initiators such as azo compounds can be used as well. In general, the initiator is present in an amount from about 0.0001 moles to 0.1 moles per 1,000 pounds of polymer products.

The copolymerization temperature is generally maintained at about 120 to 300° C., and preferably about from 180 to 260° C. The pressure is generally maintained at about 1,300 to 3,100 bar, and is preferably within the range of 1,650 to 2,100 bar.

The copolymerization is run as a continuous process in which ethylene, the reactive monomer, and (optionally) solvents or chain transfer agents are continuously fed with the initiator into a stirred reactor. An example of such a stirred reactor is given in Christi et al. in U.S. Pat. No. 2,897,183, which is hereby incorporated by reference. The rate of addition depends on variables such as the polymerization temperature, pressure, monomers employed, and concentration of monomers in the reaction mixture. The reaction mixture is continuously removed from the autoclave and, after the reaction mixture leaves the reaction vessel, the resulting copolymer is separated from the volatile unreacted monomers by conventional means—e.g., by vaporizing the unpolymerized materials and solvents under reduced pressure (relative to the reactor) and elevated temperature. After separation, the copolymer is recovered from the process typically as pellets that are blended, purged, and packaged.

Formation of Modifier Compositions

Modifier compositions are formed by dry blending polymers at concentrations as outlined in Table 1. The polymers are fed into a Coperion ZSK-25 twin-screw extruder. The extruder is equipped with a Gala underwater pelletizer for pelletizing. The screw diameter is 24.5 mm and the ratio of screw length to screw diameter (L/D) is 48. The melt temperature is between 175-185° C.; the feed rate is 20 lb/hour; and screw rate is 300 RPM.

TABLE 1

Modifier Composition Formulations

| Name | Formulation |
|---|---|
| Mod. 1 | 80 wt. % ELVALOY ™ AC 15024S + 20 wt. % Polymer 2 |
| Mod. 2 | 70 wt. % ELVALOY ™ AC 15024S + 30 wt. % Polymer 2 |
| Mod. 3 | 50 wt. % ELVALOY ™ AC 15024S + 50 wt. % Polymer 2 |
| Mod. 4 | 30 wt. % ELVALOY ™ AC 15024S + 70 wt. % Polymer 2 |
| Mod. 5 | 80 wt. % ELVALOY ™ AC 1224 + 20 wt. % Polymer 2 |
| Mod. 6 | 70 wt. % ELVALOY ™ AC 1224 + 30 wt. % Polymer 2 |
| Mod. 7 | 50 wt. % ELVALOY ™ AC 1224 + 50 wt. % Polymer 2 |
| Mod. 8 | 30 wt. % ELVALOY ™ AC 1224 + 70 wt. % Polymer 2 |
| Mod. 9 | 50 wt. % ELVALOY ™ AC 34035 + 50 wt. % Polymer 2 |
| Mod. 10 | 30 wt. % ELVALOY ™ AC 34035 + 70 wt. % Polymer 2 |
| Mod. 11 | 80 wt. % ELVALOY ™ AC 3427 + 20 wt. % Polymer 2 |
| Mod. 12 | 70 wt. % Polymer 1 + 30 wt. % Polymer 2 |
| Mod. 13 | 30 wt. % Polymer 1 + 70 wt. % Polymer 2 |
| Mod. 14 | 100 wt. % ELVALOY ™ AC 15024S |

The modifier compositions along with the talc and polycarbonate are fed into a Coperion ZSK-26 twin-screw extruder for melt blending. A K-tron T-20 feeder is used to feed talc into the extruder's throat. Talc-filled polycarbonate compositions are formed by melt blending the components via the Coperion ZSK-26 twin-screw extruder. The material is extruded through a 2 hole die and passed through a 6 foot long chilled water bath and then pelletized using a strand cutter. The melt temperature is between 305-315° C.; the feed rate is 30 lb/hour; and screw rate is 300 RPM.

Table 2 below shows the weight percent (wt. %) of the Inventive Examples (Inv.) and Comparative Examples (Comp.). As provided in Table 2, each of the examples includes 2 wt. % of a certain modifier composition, 79 wt. % polycarbonate (Makrolon 2607), 18.8 wt. % talc (CIMPACT 710C), and 0.2 wt. % Antioxidant (Irganox 1010 and Irgafos 168).

TABLE 2

Formulation of Talc-Filled Polycarbonate Compositions Inventive and Comparative Examples

| Name | Modifier | Polycarbonate | Talc | Antioxidant |
|---|---|---|---|---|
| Inv. 1 | 2 wt. % Mod. 1 | 79 wt. % | 18.8 wt. % | 0.2 wt. % |
| Inv. 2 | 2 wt. % Mod. 2 | 79 wt. % | 18.8 wt. % | 0.2 wt. % |
| Inv. 3 | 2 wt. % Mod. 3 | 79 wt. % | 18.8 wt. % | 0.2 wt. % |
| Inv. 4 | 2 wt. % Mod. 4 | 79 wt. % | 18.8 wt. % | 0.2 wt. % |
| Comp. 1 | 2 wt. % Mod. 5 | 79 wt. % | 18.8 wt. % | 0.2 wt. % |
| Comp. 2 | 2 wt. % Mod. 6 | 79 wt. % | 18.8 wt. % | 0.2 wt. % |
| Comp. 3 | 2 wt. % Mod. 7 | 79 wt. % | 18.8 wt. % | 0.2 wt. % |
| Comp. 4 | 2 wt. % Mod. 8 | 79 wt. % | 18.8 wt. % | 0.2 wt. % |
| Comp. 5 | 2 wt. % Mod. 9 | 79 wt. % | 18.8 wt. % | 0.2 wt. % |
| Comp. 6 | 2 wt. % Mod. 10 | 79 wt. % | 18.8 wt. % | 0.2 wt. % |
| Comp. 7 | 2 wt. % Mod. 11 | 79 wt. % | 18.8 wt. % | 0.2 wt. % |
| Comp. 8 | 2 wt. % Mod. 12 | 79 wt. % | 18.8 wt. % | 0.2 wt. % |
| Comp. 9 | 2 wt. % Mod. 13 | 79 wt. % | 18.8 wt. % | 0.2 wt. % |
| Comp. 10 | 2 wt. % Mod. 14 | 79 wt. % | 18.8 wt. % | 0.2 wt. % |

The Inventive and Comparative Examples are measured for dart impact in accordance with the test method described above. The results are reported in Table 3 below. As can be seen, the Inventive Examples (i.e., the talc-filled polycarbonate compositions with modifier compositions comprising Polymer 2 and ELVALOY™ AC 15024S, an ethylene/methyl acrylate copolymer having a methyl acrylate content of 24 wt. % and a melt index ($I_2$) of 50 g/10 min) have a surprisingly and significantly higher dart impact when compared to the Comparative Examples with corresponding weight percent of Polymer 2 and Polymer 1, ELVALOY™ AC 1224, ELVALOY™ AC 34035, or ELVALOY™ AC 3427. Without being bound by theory, Polymer 2 can react with the hydroxide groups of talc to inhibit the degradation of polycarbonate and ELVALOY™ AC 15024S can provide positive synergy with the Polymer 2 to significantly increase dart impact.

TABLE 3

Dart Impact Results

| Name | Dart Impact (J) |
|---|---|
| Inv. 1 | 13.5 |
| Inv. 2 | 17.4 |
| Inv. 3 | 18.6 |
| Inv. 4 | 19.9 |
| Comp. 1 | 4.9 |
| Comp. 2 | 9.7 |
| Comp. 3 | 11.1 |

TABLE 3-continued

| Dart Impact Results | |
|---|---|
| Name | Dart Impact (J) |
| Comp. 4 | 17.0 |
| Comp. 5 | 10.7 |
| Comp. 6 | 14.2 |
| Comp. 7 | 6.1 |
| Comp. 8 | 5.6 |
| Comp. 9 | 4.5 |
| Comp. 10 | 5.6 |

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

I claim:

1. A talc-filled polycarbonate composition, the composition comprising:

(a) at least 65 wt. % of a polycarbonate;

(b) from 10 to 30 wt. % of a talc; and (c) from 0.5 to 5.0 wt. % of a modifier composition, the modifier composition comprising (i) greater than 25 wt. %, based on total weight of components in the modifier composition, of an ethylene interpolymer comprising copolymerized units of ethylene and a comonomer selected from the group consisting of maleic anhydride, maleic acid monoester, maleic acid diester, fumaric acid monoester, carboxylic acid, itaconic acid, fumaric acid, itaconic acid monoester, and combinations thereof, and (ii) from 5 to 75 wt. %, based on total weight of components in the modifier composition, of an ethylene/methyl acrylate copolymer having a melt index (12) of greater than 15 g/10 min; and wherein the talc-filled polycarbonate composition has a dart impact greater than 13.0 J.

2. The polycarbonate composition of claim 1, wherein the comonomer of the ethylene interpolymer is maleic acid monoester.

3. The polycarbonate composition of claim 1, wherein the comonomer of the ethylene interpolymer is present in an amount of from 5 to 15 wt. %, based on total weight of the ethylene interpolymer.

4. The polycarbonate composition of claim 1, wherein the ethylene/methyl acrylate copolymer has a methyl acrylate content of from 15 to 40 wt. %, based on total weight of the ethylene/methyl acrylate.

5. The polycarbonate composition of claim 1, wherein the polycarbonate composition has a dart impact greater than 15.0 J.

6. A method of manufacturing the talc-filled polycarbonate composition of claim 1, the method comprising:

blending together (a), (b) and (c).

7. The method of claim 6, wherein the comonomer of the ethylene interpolymer is maleic acid monoester.

8. The method of claim 6, wherein the comonomer of the ethylene interpolymer is present in an amount of from 5 to 15 wt. %, based on total weight of the ethylene interpolymer.

9. The method of claim 6, wherein the ethylene/methyl acrylate copolymer has a methyl acrylate content of from 15 to 40 wt. %, based on total weight of the ethylene/methyl acrylate.

10. The method of claim 6, wherein blending is done by melt blending.

11. The polycarbonate composition of claim 1, wherein the modifier composition comprises from 10 to 75 wt. % of the ethylene/methyl acrylate copolymer, based on total weight of components in the modifier composition.

12. The polycarbonate composition of claim 1, wherein the modifier composition comprises from 20 to 70 wt. % of the ethylene/methyl acrylate copolymer, based on total weight of components in the modifier composition.

13. The polycarbonate composition of claim 1, wherein, for the modifier composition, the ethylene/methyl acrylate copolymer has a melt index (12) of greater than 25 g/10 min.

14. The polycarbonate composition of claim 1, wherein, for the modifier composition, the ethylene/methyl acrylate copolymer has a melt index (12) of greater than 35 g/10 min.

15. The polycarbonate composition of claim 1, wherein the modifier composition comprises greater than 45 wt. % of the ethylene interpolymer, based on total weight of components in the modifier composition, and wherein the talc-filled polycarbonate composition has a dart impact greater than 15.0 J.

16. The polycarbonate composition of claim 1, wherein the modifier composition comprises greater than 55 wt. % of the ethylene interpolymer, based on total weight of components in the modifier composition, and wherein the talc-filled polycarbonate composition has a dart impact greater than 17.0 J.

17. An article formed from the polycarbonate composition of claim 1.

* * * * *